United States Patent [19]

May

[11] 4,339,161
[45] Jul. 13, 1982

[54] BEARING SEAL FOR A DRILL HEAD ASSEMBLY

[75] Inventor: Francis A. May, Pittsburgh, Pa.

[73] Assignee: Consolidation Coal Company, Pittsburgh, Pa.

[21] Appl. No.: 176,645

[22] Filed: Aug. 11, 1980

[51] Int. Cl.$^3$ .............................................. F16C 33/78
[52] U.S. Cl. ............................ 308/187.1; 308/207 R
[58] Field of Search ................ 308/187.1, 207 R, 210, 308/187.2, 36.2, 36.1, 207 A

[56] References Cited

U.S. PATENT DOCUMENTS

| | | | |
|---|---|---|---|
| 2,667,388 | 1/1954 | Schick | 308/187.1 |
| 2,712,970 | 7/1955 | Spicacci | 308/187.2 |
| 2,913,289 | 11/1959 | Stevenson | 308/187.1 |
| 3,190,369 | 6/1965 | Pyles | 173/23 |
| 3,218,110 | 11/1965 | Conner | 308/187.2 |
| 3,547,206 | 12/1970 | Phillips | 173/105 |
| 3,654,961 | 4/1972 | Phillips | 137/624.13 |
| 3,861,765 | 1/1975 | Follert et al. | 308/8.2 |
| 4,060,289 | 11/1977 | Gee et al. | 308/187.1 |
| 4,061,377 | 12/1977 | Nordström | 308/207 R |
| 4,084,861 | 4/1978 | Greenberg et al. | 308/26 |
| 4,092,054 | 5/1978 | Dye | 308/8.2 |
| 4,283,963 | 8/1981 | Hickey et al. | 308/207 R |
| 4,304,446 | 12/1981 | Goodine | 308/187.1 |

*Primary Examiner*—Lenard A. Footland
*Attorney, Agent, or Firm*—William A. Mikesell, Jr.; Stanley J. Price, Jr.; John M. Adams

[57] ABSTRACT

A drill housing includes an internal chamber with a rotatable drill retaining member positioned in the chamber and extending outwardly through the chamber upper open end portion. A hub member is positioned in surrounding nonrotatable engagement with the drill retaining member. A rotary motor is drivingly connected to the hub member to transmit rotation to the drill retaining member. The drill retaining member has a socket for receiving the shank of a drill steel that rotates with the drill retaining member. A first main bearing rotatably supports the hub member, and a stationary bearing carrier supports the first main bearing. A cover plate surrounds the drill retaining member and rotates with the hub member. A bearing seal is positioned between the cover plate and the bearing carrier to seal the first main bearing. The bearing seal has a rotatable portion that rotates with the cover plate and a stationary portion that abuts the bearing carrier. The stationary portion carries an annular seal in sealing relation with the bearing carrier. The annular seal is compressible to absorb lateral and vertical thrust forces from the drill steel and to transfer the forces to the first main bearing. The bearing seal by permitting horizontal and vertical movement to be transmitted outwardly from the drill retaining member, eliminates separation of the annular seal from its supporting surface.

15 Claims, 4 Drawing Figures

BEARING SEAL FOR A DRILL HEAD ASSEMBLY

BACKGROUND OF THE INVENTION

1. Field of the Invention

This invention relates to a bearing seal for a rotatable member assembly and more particularly to a seal for the main bearing of a drill head assembly in which the seal is positioned between a rotatable cover plate and a stationary bearing carrier and is operable to convert lateral and vertical thrust forces applied to the cover plate by a drill steel to external free rolling forces which substantially reduce wear and deterioration of the bearing seal in underground mine drilling operations.

2. Description of the Prior Arts

In rock drilling operations, as encountered in underground mining and excavating, it is the conventional practice to drill holes in a rock formation by a rotary drill assembly or by a rotary percussion drill assembly. U.S. Pat. Nos. 3,547,206 and 3,654,961 are examples of such drill assemblies which include a drill pot that carries a hydraulic motor having a motor shaft nonrotatably connected to a bevel gear which meshes with another bevel gear rotatably journaled on a support member or hub within the drill pot housing. The hub is fixed to a rotatable head or pot cover and has a seat into which the shank of a drill steel is received. A drill bit is positioned on the upper end of the drill steel. With this arrangement rotation of the motor shaft is transmitted to the drill steel to rotate the drill bit.

Generally the drill assembly is incorporated with a self-propelled machine that maneuvers the drill pot into position and moves the drill pot in the axial direction of advancement of the drill bit into the rock formation. For rock drilling operations in an underground mine the drill assembly is supported by a boom that is pivotally mounted on the front of a mobile frame. Upward pivotal movement of the boom moves a drill steel seated in the pot cover into drilling position. As the drill steel rotates, the boom exerts upward pressure upon the drill assembly to increase the driving thrust upon the drill steel. This advances the drill steel vertically into the rock formation as rock material is dislodged to form an elongated bore in the rock formation. The upward force exerted upon the drill assembly by the boom overcomes the resistance encountered by the rock structure to rotation of the drill bit. An example of such a drilling machine is disclosed in U.S. Pat. No. 3,190,369.

As the drill bit advances into the rock formation by the upward thrust applied by the drill boom, the resistive forces encountered exert tremendous lateral and vertical thrust forces on the drill steel. These thrust forces are transmitted through the drill steel to the drill retaining member and to the main bearings which rotatably support the drill retaining member. The effect of the lateral and vertical thrust forces is to apply a dry rubbing motion upon the drill retaining member and the conventional lip seal that is positioned between the rotatable cover plate and the stationary bearing carrier to seal the upper main bearing. The lateral and vertical thrust forces promote wear of the conventional lip seal particularly in view of the dry and dusty atmosphere encountered in mine drilling operations where wear of the lip seal is accelerated.

The failure of the lip seal results in deterioration of the seal for the main bearing thus exposing the main bearing to dust contamination and eventual failure with resultant damage to the drive gearing. Also failure of the lip seal and damage to the main bearing is known to result in misalignment of the drill retaining member from an axial position in the drill housing. This causes grooving of the drill retaining member and the shank of the drill steel.

Failure of the lip seal requires that the drill head assembly be removed from operation for replacement of the lip seal. This must be done frequently to prevent damage to the main bearings. However, in the event that the main bearings become damaged, the main bearings must be replaced. Also the entire drill head assembly must be disassembled to remove the contaminants that have entered the drill housing chamber. These repair operations are costly and time consuming.

While it has been suggested by the known devices to provide seal assemblies for bearings used in rotatable drill heads, the known devices require substantial modification to the bearing carrier in order to accommodate the seal assembly. Known arrangements for sealing a bearing that supports a rotatably driven shaft such as the shank of a drill steel in a drill head assembly are disclosed in U.S. Pat. Nos. 2,667,388; 2,712,970; 2,913,289; 3,218,110; 3,861,765; 4,060,289; 4,084,861; and 4,092,054. Each of these devices utilize various seal arrangements as an additional element separate and distinct from the bearing.

Therefore, there is need to provide for a rotatable drill head assembly, a bearing seal adaptable to replace the conventional lip seal without requiring modifications to be made to the internal structure of the drill head assembly and perform the dual purpose of a seal for the main bearing and a sealing member to transmit the lateral and vertical thrust forces generated by the drill steel to the main bearing without damage to the bearing seal.

SUMMARY OF THE INVENTION

In accordance with the present invention there is provided a drill head assembly that includes a drill housing having a chamber. The chamber includes an upper open end portion and a lower open end portion. A rotatable drill retaining member is positioned in the drill housing chamber and extends through the chamber upper open end portion. A hub member is positioned in surrounding coaxial relation with the rotatable drill retaining member. The hub member and the rotatable drill retaining member are drivingly connected. Drive means secured to the hub member transmits rotation to the hub member and to the rotatable drill retaining member. Sealing means positioned in the chamber adjacent the lower open end portion thereof and abutting the hub member seals the chamber lower open end portion. Bearing means rotatably supports the hub member in the chamber. The bearing means includes a first main bearing positioned in the chamber adjacent the upper open end portion thereof. A bearing carrier is secured to the drill housing. The bearing carrier supports the first main bearing in the chamber. The drive means is positioned in the chamber below the first main bearing. A cover plate surrounds the rotatable drill retaining member to close the chamber upper open end portion. The cover plate is connected to the hub member and the rotatable drill retaining member. An annular seal device sealingly engages the bearing carrier above the first main bearing between the first main bearing and the cover plate. The annular seal device is operable to seal the chamber upper open end portion from the entrance of foreign matter therein and to prevent the escape of lubricant from the chamber. Load stress relieving means prevents wear of the cover plate. The load stress relieving means is positioned between the cover plate and the annular seal device and includes a first surface abutting the cover plate and a second surface abutting the annular seal device. The load stress relieving means is rotatable with the cover plate to prevent wear forces from being applied to the annular seal device and failure of the seal maintained at the chamber upper open end portion.

Further in accordance with the present invention there is provided a drill head assembly that includes a drill housing having a chamber. The chamber includes an upper open end portion and a lower open end portion. A rotatable drill retaining member is positioned in the drill housing chamber and extends through the chamber upper open end portion. A hub member is positioned in surrounding coaxial relation with the rotatable drill retaining member. The hub member and the rotatable drill retaining member are drivingly connected. Drive means secured to the hub member transmits rotation to the hub member and the rotatable drill retaining member. Sealing means positioned in the chamber adjacent to the lower open end portion thereof and abutting the hub member seals the chamber lower open end portion. Bearing means rotatably supports the hub member in the chamber. The bearing means includes a first main bearing positioned in the chamber adjacent to the upper open end portion thereof. A bearing carrier is secured to the drill housing. The bearing carrier supports the first main bearing in the chamber. The drive means is positioned in the chamber below the first main bearing. A cover plate surrounds the rotatable drill retaining member to close the chamber upper open end portion. The cover plate is connected to the hub member to rotate with the hub member and the rotatable drill retaining member. A bearing seal is positioned between the cover plate and the bearing carrier above the first main bearing to seal the first main bearing in the drill housing. The bearing seal has a rotatable portion abutting the cover plate and a stationary portion abutting the bearing carrier. An annular seal member is carried by the stationary portion in sealing relation with the bearing carrier. The annular seal member is compressible to absorb lateral and vertical forces and to transfer the forces to the first main bearing so that only rotational forces are carried by the cover plate and the drill retaining member.

Preferably, the rotatable portion includes an inner bearing race abutting said cover plate. The stationary portion includes an outer bearing race adapted to maintain the annular seal member in sealing relation with the bearing carrier. The outer bearing race is stationarily supported by the bearing carrier. The inner and outer bearing races are sealed to prevent the escape of lubricant from and the entry of contaminants into the main bearing and between the inner and outer bearing races. The inner and outer bearing races are operable to convert rubbing motion applied to the drill retaining member to lubricated rolling motion applied to the drill retaining member.

Lubricant is maintained between the inner and outer bearing races of the bearing seal. The outer bearing race includes a seal carrier having an outer annular groove. The annular seal member is positioned in the outer annular groove and is compressed in sealing engagement with the bearing carrier.

With this arrangement the annular seal member, which is in one embodiment an elastomer seal ring, is operable to absorb both horizontal and vertical forces that are transmitted to the cover plate and the hub member by a drill steel positioned in the drill retaining member. Consequently, movement of the bearing seal between the cover plate and the bearing carrier is permitted.

The vertical and lateral thrust forces applied to the bearing seal are absorbed by the compressible annular seal member and are converted by the bearing seal to rotational forces thereby generating an external rolling motion. Consequently the rubbing motion herebefore applied to the rotating cover plate and the drill retaining member is absorbed by the bearing seal and converted to a rotary motion at the cover plate and the drill retaining member to prevent interval grooving of the cover plate and the drill retaining member. This arrangement also prevents the resultant destruction of the bearing seal.

Additionally, in accordance with the present invention there is provided a bearing seal for a rotatable shaft positioned in a chamber that includes an annular cartridge having a rotatable bearing portion and a stationary seal portion. The rotatable bearing portion is adaptable to maintain an effective seal around the shaft within the chamber. Ball bearing means is positioned between the rotatable bearing portion and the stationary seal portion for permitting rotation of the rotatable bearing portion relative to the stationary seal portion. Means is connected to the rotatable bearing portion and the stationary seal portion for maintaining lubricant sealed in surrounding with the ball bearing means. An annular seal member is carried by the stationary seal portion in compression for lateral and vertical movement to maintain a seal around the shaft while permitting lateral and vertical movement of the annular cartridge to relieve radial loads applied thereto.

Further in accordance with the present invention, by providing a lubricated bearing seal the dry and dusty atmosphere in which the drill head assembly is most commonly operated can be tolerated without the failure of the main bearings by the entrance of contaminants into contact with the main bearings. By providing the bearing seal with internal lubrication the deleterious affects of heat and operation in the dirty and gritty environment of an underground mine are overcome.

Accordingly, the principal object of the present invention is to provide a drill head assembly that includes a load stress relieving seal between a main bearing that rotatably supports a drill retaining member and a rotatable cover plate to replace the conventional lip seal and transmits lateral and vertical thrust loads to the main bearing and thereby relieve the seal of thrust and radial loads.

Another object of the present invention is to provide in a drill head assembly a combination bearing and seal operable to convert dry rubbing motion at the drill shaft to lubricated external rolling motion by the provision of static and dynamic seal components that are maintained in abutting, sealed relation between a bearing carrier and a rotatable cover plate of the drill head assembly.

A further object of the present invention is to provide a bearing seal for the main bearing of a drill head assembly in which the bearing seal is internally lubricated and supported in the drill head assembly for vertical and horizontal movement so that thrust and radial loads applied to the bearing seal by a drill shaft are transferred to the main bearing so as to relieve the bearing seal of all thrust and radial loading.

An additional object of the present invention is to provide an internally lubricated bearing seal operable to convert dry rubbing motion to lubricated rolling motion.

Another object of the present invention is to provide a lightweight internally lubricated ball bearing supported for vertical and horizontal movement so as to be relieved of thrust loading and further operable to transfer rubbing motion at a drill shaft to external rolling motion to prevent wear of the drill shaft and wear of a main bearing and drive gearing for a drill head assembly.

These and other objects of the present invention will be more completely disclosed and described in the following specification, the accompanying drawings, and the appended claims.

DESCRIPTION OF THE PREFERRED EMBODIMENTS

Figure 1:
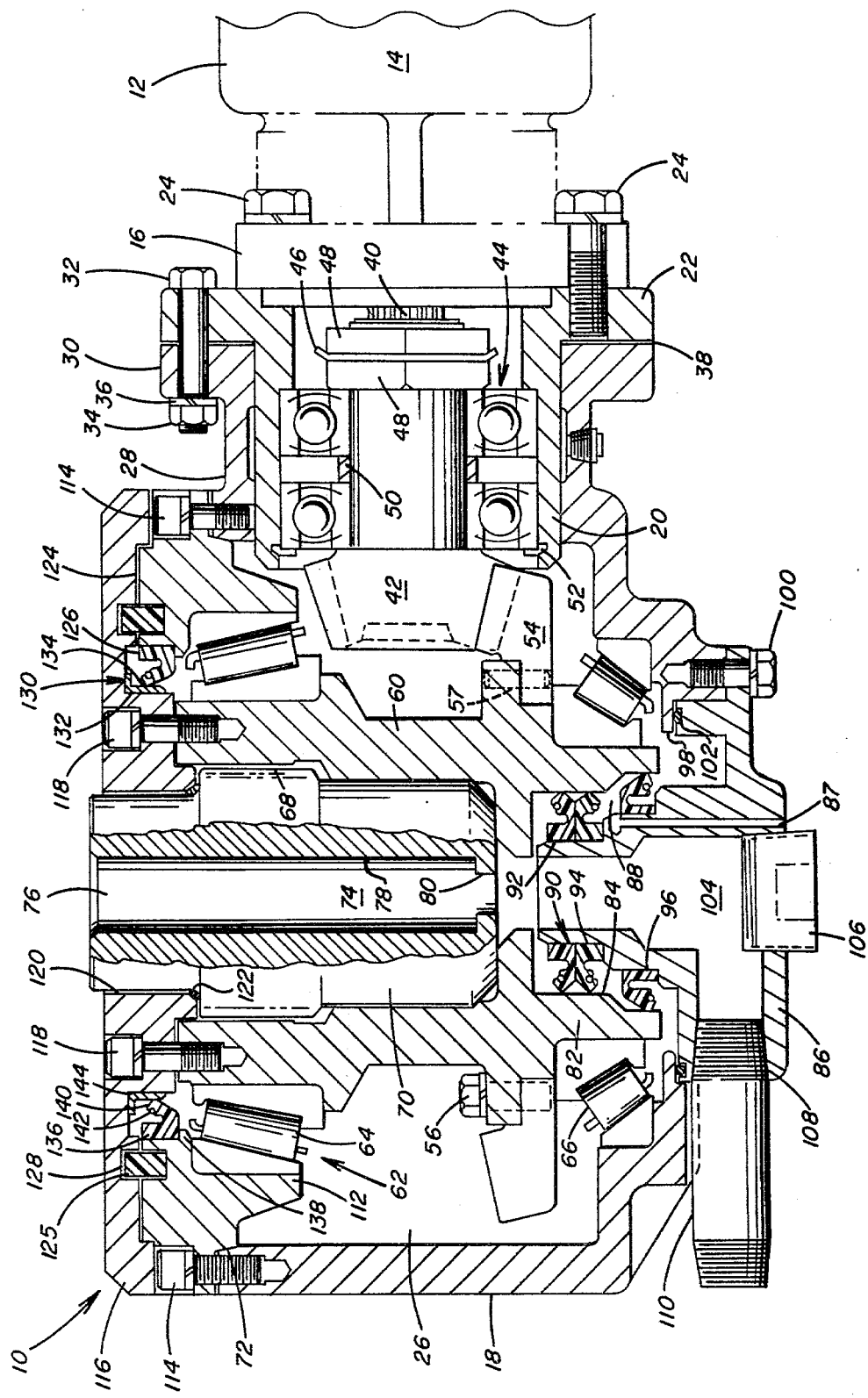
FIG. 1 is a sectional view in side elevation of a drill head assembly with the drill steel removed, illustrating a wear resistant seal positioned between a rotatable cover plate and the upper end of a main bearing.

Referring to the drawings and particularly to FIG. 1, there is illustrated a drill head assembly generally designated by the numeral 10 adaptable for use in underground mine drilling operations and driven by a rotary motor 12. The motor 12 is preferably hydraulically operated and is drivingly connected to the drill head assembly to rotate the shank of a drill steel (not shown) that is rotatably retained within the drill head assembly 10. As well known in the art the drill steel includes a drill bit at its upper end portion for dislodging rock material. The drill steel and drill bit are centrally bored to facilitate removal from the drilled hole rock dust ground by the bit.

The drill head assembly 10 of the present invention is particularly adapted for use in drilling bores holes in a mine roof of an underground mine in which holes roof bolt devices are installed to support an unsupported section of the roof above a mine passage. In one mode of operation, the drill head assembly 10 is pivotally connected to a pair of parallel, spaced boom members that project outwardly from a mobile vehicle. The vehicle moves the rotary drill to selected locations in the mine for drilling bolt holes in the mine roof and inserting roof bolts in the drilled holes. Once the vehicle is moved to a selected location in the mine passage, the boom members are raised vertically as the rotating drill bit is advanced into the mine roof. Solid material is dislodged forming an elongated hole for receiving a roof bolt. It will also be apparent from the present invention that the drill head assembly 10 is adaptable with other types of mine roof drilling machines, such as a mast-type drilling machine.

The rotary motor 12 includes a housing 14 having a flange portion 16. The drill head assembly 10 includes a generally cylindrical housing 18 and a mounting collar 20 which extends outwardly from the housing 18 adjacent to the motor housing 14. The mounting collar 20 includes a mounting ring or flange 22 positioned in abutting relation with the motor flange 16. The mounting flange 22 and the motor flange 16 have aligned bores for receiving bolts 24 to thereby connect the motor flange 16 and the mounting flange 22 to, in turn, connect the motor housing 14 to the drill housing 18.

The drill housing 18 includes an internal cavity or chamber 26 with an opening thereto formed by a tubular housing portion 28 through which extends the mounting collar 20. The tubular housing portion 28 includes a flange 30 which is positioned in abutting relation with the mounting flange 22, and a plurality of bolts 32 extent through aligned bores of flanges 22 and 30. Hex nuts 34 and washers 36 are secured on the ends of the bolts 32 that protrude from the housing flange 30 to tightly secure together the tubular housing portion 28 and the mounting collar 20. Also shims 38 are positioned between the opposite abutting faces of the flanges 22 and 30 to provide a pinion to ring gear backlash adjustment.

A drive shaft 40 extends through an opening of the motor housing 14 into the internal cavity 26 of the drill housing 18. A bevel pinion 42 is rotatably supported by a sealed bearing assembly generally designated by the numeral 44 within the mounting collar 20. The bevel pinion 42 is spline connected to the end of the drive shaft 40 and is clamped to the bearing assembly 44 by a lockwasher 46 and a pair of locknuts 48. The sealed bearing assembly 44 is positioned within an annular recessed portion of the mounting collar 20 and the bearing pairs are retained in place on the bevel pinion 42 by a spacer 50 and a snap ring 52 which engages the inner end of the bearing assembly 44 to the end of the mounting collar 20.

The bevel pinion 42 meshes with a ring gear 54 that is nonrotatably connected by capscrews 56 and a plurality of dowel pins 57 (only one of which is shown in FIG. 1) to a lower flange of a hub member 60. A bearing assembly generally designated by the numeral 62 rotatably supports the hub member 60 in the drill housing chamber 26. The bearing assembly 62 includes a first main bearing 64, such as a tapered roller bearing, and a second main bearing 66, such as a tapered roller bearing. The first main bearing 64 rotatably supports the upper end portion of the hub member 60 within the drill housing chamber 26, and the second main bearing 66 rotatably supports the lower end portion of the hub member 60 in the drill housing chamber 26.

The hub member 60 is splined at 68 to a drill retaining member 70, such as a rotatable chuck. The drill retaining member 70 is supported in the drill housing 18 to extend through an opening 72 in the upper end portion of the drill housing 18.

The rotatable drill retaining member 70 includes a bore 74 that extends axially through the drill retaining member. The bore 74 includes an upper end portion 76 and a lower end portion 78 positioned on a shoulder 80 of the drill retaining member 70. A cylindrical portion at the end of the shank drill steel is received within the bore enlarged cylindrical portion 76 and a hexagonal end of the shank of the drill steel is coupled to the drill retaining member 70 within the hexagonal bore portion 78.

The rotary motor 12 is remotely controlled to rotate the drive shaft 40 at a preselected speed. Rotation is transmitted from the drive shaft 40 through the bevel pinion 42 and the ring gear 54 to the hub member 60. By virtue of the spline connection of the hub member 60 to the drill retaining member 70 rotation of the hub member 60 is transmitted to the drill retaining member 70. With the drill steel nonrotatably secured within the hexagonal bore portion 78 of the bore 74 rotation of the drill retaining member 70 generates rotation of the drill steel.

The hub member 60 includes a lower end portion 82 that is rotatably supported within the drill housing chamber 26 by the second main bearing 66. The hub member 60 has an axial passageway 84 therethrough, and a seal carrier 86 extends into the axial passageway 84 into an axial position within the hub lower end portion 82. An annular space 88 is thus formed between the outer surface of the seal carrier 86 and the inner surface of the hub lower end portion 82 within the axial passageway 84.

The annular space 88 is sealed by a seal assembly generally designated by the numeral 90 that includes an upper pair of conventional oil lip seals 92 and 94 and a lower oil lip seal 96. The lip seals 92–96 are suitably carried by the seal carrier 86 and sealingly engage the internal surface of the hub member 60 surrounding the lower end portion of the axial passageway 84. The lip seal 96 prevents the escape of lubricant from the drill housing chamber 26 into the annular space 88. The lip seals 92 and 94 prevent the entrance of foreign material into the drill housing chamber 26 through the annular space 88. A passage 87 extends up through the seal carrier 86 into the annular space 88 between the lip seals 94 and 96. In the event an excessive amount of lubricant should accumulate within the space 88, rather than leaking around the seals 92 and 94 and into a dust passageway 104 of the carrier 86 causing obstruction of the passageway 104, the excess lubricant is safely diverted through passage 87 and out of the space 88 to the atmosphere.

The drill housing 18 also includes a lower opening 98 into the drill housing chamber 26. The seal carrier 86 extends upwardly through the lower opening 98 and is rigidly connected thereto by a plurality of capscrews 100 that extend through aligned bores in the seal carrier 86 and the lower end of the drill housing 18 surrounding the opening 98. An O-ring 102 is positioned in a groove of the seal carrier 86 and is compressed by the lower end of the drill housing 18 adjacent to the lower opening 98 to thereby provide a sealed connection of the seal carrier 86 to the lower end portion of the drill housing 18. The seal carrier 86 also includes a passageway 104 therethrough that communicates with the drill housing axial passageway 84 and the reduced cylindrical portion 80 of the drill retaining member bore 74.

An access plug 106 is threadedly secured to the seal carrier 86 and permits access into the seal carrier passageway 104 below the hub member 60 and the drill retaining member 70 for the purpose of removing an accumulation of dust and rock cuttings conveyed from the central bore of the cutter bit and drill steel in the event passageway 104 becomes plugged. The seal carrier 86 is provided with an exhaust port 108 that communicates with the passageway 104, the passageway 84, and the drill retaining bore 74. The exhaust port 108 is adapted for threaded connection to a pipe section 110 that is arranged for connection to a conventional vacuum dust collecting system. With this arrangement dust and rock cuttings are drawn through the drill bit and drill steel and from the drill retaining member bore 74 into the seal carrier passageway 104 and therefrom into a collection box without escaping into the air.

As discussed above, the upper end portion of the drill retaining member 70 is rotatably supported within the drill housing 18 by the first main bearing 64. The first main bearing 64 is retained within the drill housing chamber 26 by a bearing carrier 112. The bearing carrier 112 is stationarily secured to the upper peripheral edge of the drill housing 18 by a plurality of threaded members 114. A cover plate 116 is positioned in overlying abutting relation with the upper end of the drill housing 18 and the bearing carrier 112 to close the opening 72 into the drill housing 18. The cover plate 116 is, in turn, connected for rotation with the hub member 60 relative to the drill housing 18 and the bearing carrier 112 by threaded members 118. The threaded members 118 extend through aligned bores in the cover plate 116 and the hub member 60.

The cover plate 116 includes a central opening 120 through which the upper end of the drill retaining member 70 extends. An O-ring 122 is positioned within the cover plate central opening 120 in surrounding relation with the upper end of the drill retaining member 70. The O-ring 122 keeps dirt and other contaminants out of the splined connection 68 of the drill retaining member 70 to the hub member 60. A labyrinth seal 124 is provided between the rotatable cover plate 116 and the stationary bearing carrier 112. The labyrinth seal 124 preferably includes wheel bearing lubricant (not shown) installed prior to assembly of the cover plate 116 on the drill housing 18.

A dust seal 125 is retained within a recess 128 formed by the cover plate 116 and the bearing carrier 112. An annular seal device 126 engages the bearing carrier 112 above the first main bearing 64 between the first main bearing 64 and cover plate 116. With this arrangement the annular seal device 126 is operable to seal the upper portion of the drill housing chamber 26 from the entrance of foreign matter therein and to prevent the escape of lubricant in the labyrinth seal 124 from the drill housing chamber 26.

In accordance with the present invention a wear sleeve designated by the numeral 130 is positioned on the outer surface 144 of the cover plate 116 to prevent wear of the cover plate. The wear sleeve 130 is also operable when required as a load stress relieving device which is designated by the numeral 130 in FIGS. 1–3 and in each embodiment thereof the load stress relieving device 130 is positioned between the cover plate 116 and the bearing carrier 112. In each embodiment and as particularly illustrated in FIG. 1, the wear sleeve 130 as a load stress relieving device includes a first face 132 abutting the cover plate 116 and a second face 134 abutting the annular seal device 126. The wear sleeve 130 is rotatable with the cover plate 116 in accordance with the present invention to prevent wear forces from being applied to the cover plate 116 and failure of the seal device 126 maintained at the housing chamber upper open end portion 72.

As illustrated by the embodiment of the present invention in FIG. 1, the annular seal device 126 includes an annular lip seal 136. The lip seal 136 is supported by an inner annular shoulder 138 of the bearing carrier 112. With this arrangement the lip seal 136 is stationarily positioned relative to the rotatable cover plate 116 and the hub member 60. The lip seal 136 includes a lip 140 that is urged into sealing engagement by an annular spring clip 142 with the second face 134 of the wear sleeve 130. The lip seal 136 is compressible to absorb both lateral and vertical thrust forces transmitted from the cover plate 116 to prevent wear of the lip seal 136.

By preventing wear of the lip seal 136 the entrance of contaminants into the drill housing chamber 26 and particularly into contact with the first main bearing 64 is prevented. This serves to promote the life of the first main bearing 64 and prevent wear and damage which may occur thereto and also to the hub member 60 and the drill retaining member 70 by premature failure of the first main bearing 64. Consequently, the drill head assembly 10 of the present invention will be subject to less downtime for repair of damage to any of the moving parts of the drill head assembly 10 resulting from premature deterioration of the seal for the first main bearing 64.

Figure 2:
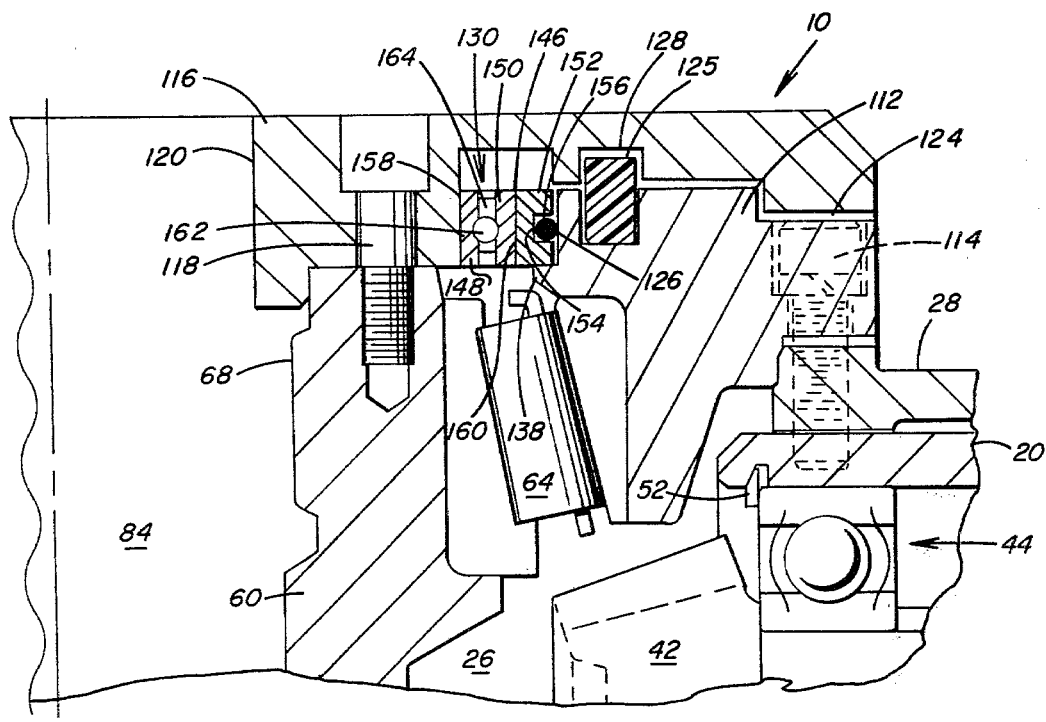
FIG. 2 is a fragmentary view in side elevation of the drill head assembly shown in FIG. 1, illustrating an embodiment of the bearing seal that includes a lubricated ball bearing seal between a rotatable cover plate and a stationary bearing carrier.

Now referring to FIG. 2, there is illustrated another embodiment of the load stress relieving device 130 that includes a bearing seal 146 positioned between the cover plate 116 and the bearing carrier 112 oppositely of the first main bearing 64 and thereby operable to seal the first main bearing 64 in the drill housing chamber 26. Preferably, the bearing seal 146 has a rotatable portion 148 abutting the cover plate 116 and a stationary portion 150 abutting the bearing carrier 112. The annular seal device 126 is positioned by the bearing seal 146 in sealing relation with the bearing carrier 112. The annular seal device 126 is compressible to absorb lateral and vertical thrust forces generated as the first main bearing progressively wears and to transfer these forces through the hub member 60 to the first main bearing 64 so that only rotational forces are carried by the cover plate 116 and the drill retaining member 70. With this arrangement of the compressible annular seal device 126, a concentric position of the shank of the drill steel in the drill retaining member 70 is maintained thereby eliminating the need for exactly centered circles surrounding the drill steel in the drill retaining member 70.

The annular seal device 126 in FIG. 2 preferably includes a seal carrier or an outer race adapter ring 152 provided with an O-ring groove 154. An elastomer seal ring 156 is positioned in the seal carrier O-ring groove 154. The elastomer seal ring 156 is resilient and thereby capable of being compressed between the seal carrier 152 and the bearing carrier 112 to permit lateral and vertical motion of the entire bearing seal 146. Thus the bearing seal 146 is capable of compensating for eccentric motion of the drill steel and the drill retaining member 70. As a result an eccentric position of the drill steel and drill retaining member 70 can be tolerated. The resilient seal ring 156 is the only member of the bearing seal 146 in contact with the bearing carrier 112. Thus in the event of eccentric movement of the drill steel and retaining member 70, i.e. movement of the drill steel from an exact concentric position in the drill housing 18, the seal ring 156 is capable of being compressed to absorb the eccentric movement of the drill steel and thereby maintain the drill steel and drill retaining member 70 concentrically positioned in the drill housing 18.

The bearing seal rotatable portion 148 includes an inner bearing race 158 abutting the cover plate 116. The bearing seal stationary portion 150 includes an outer bearing race 160 adapted to maintain the annular seal member or elastomer seal ring 156 in sealing relation with the bearing carrier 112. Positioned between the inner bearing race 158 and the outer bearing race 160 are a plurality of ball bearings 162, one of which is illustrated in FIG. 2. The ball bearings 162 abut and are supported by the inner bearing race 158 and thereby rotate with the cover plate 116. On the opposite side of the ball bearings 162 the ball bearings abut the outer bearing race 160. The ball bearings 162 are sealed within the inner and outer bearing races 158 and 160 by ring-like cages 164. The cages 164 maintain lubricant sealed within the inner and outer bearing races 158 and 160 in contact with the ball bearings 162.

The bearing seal 146 is a lubricated bearing adapted to resist the deleterious environment of an underground mine that is known to hasten the failure of the main bearings 64 and 66 or any other moving parts of the drill head assembly by the entrance of dust and other contaminants into the drill head assembly. It is the feature of the ring-like cage 164 that maintains lubricant around the ball bearings 162 so that dust contaminants do not come into contact with the main bearings 64 and 66. This arrangement permits the drill head assembly 10 to operated more efficiently in the dusty atmosphere of an underground mine.

Thus, with the present invention as illustrated in the embodiment of FIG. 2, the inner and outer bearing races 158 and 160 are sealed to prevent the escape of lubricant from around the first main bearing 64 and between the inner and outer bearing races 158 and 160. The inner and outer bearing races 158 and 160 are thus operable to convert rubbing motion applied to the cover plate 116 to lubricated rolling motion applied to the bearing seal 146. Further in accordance with the present invention, the bearing seal 146 formed by the inner and outer bearing races 158 and 160 and the seal carrier 152 and elastomer seal ring 156 are operable to replace the conventional lip seal that is utilized in conventional drill head assemblies between the rotatable cover plate 116 and the stationery bearing carrier 112.

The cavity dimension between the cover plate 116 and the bearing carrier 112 is occupied by the assembly of the seal carrier 152 and seal ring 156 on the outer bearing race 160. Preferably the seal carrier or outer race adapter ring 152 is pressed fit onto the outer bearing race 160 and is supported by the bearing carrier inner annular shoulder 138. The outer bearing race 160 positions the outer race adapter ring or seal carrier 152 on the inner annular shoulder 138 so that the elastomer seal ring 156 is compressed into contact with the bearing carrier 112. With the elastomer seal ring 156 being retained in compression between the nonrotatable outer bearing race 160 and the bearing carrier 112, lateral and vertical motion of the lubricated bearing seal 146 is permitted so as to relieve the bearing seal 146 of radial loads applied to the bearing seal 146 by drill steel through the drill retaining member 70.

Thus, the load stresses generated by radial loads are diverted or bypassed away from the bearing seal 146 and are transferred directly to the first main bearing 64. Consequently, all loading normally applied to the seal around the drill retaining member 70 is now transferred to the heavy duty first main bearing 64 and are relieved or removed from the bearing seal 146 that is positioned between the rotatable cover plate 116 and the stationary bearing carrier 112. Further, with the provision of lubricated rolling motion of the bearing seal 146 dry rubbing motion upon the circular portion of the cover plate 116 is converted to a lubricated rolling motion. As a result, wear of the cover plate 116 is eliminated. Also lateral and vertical motion of the bearing seal 146 is permitted without a deleterious load being exerted on the inner and outer bearing races 158 and 160 because the bearing seal 146 is movable within the degree of elasticity provided by the elastomer seal ring 156 on the seal carrier 152.

Damage to the cover plate 116 is normally attributed to premature wear of the conventional lip seal and is thus prevented with the present invention because the radial loads which normally result in wear of the conventional lip seal and premature failure of the main bearings are relieved by the bearing seal 146. These radial loads are now transmitted to the hub member 60 and the first main bearing 64. The lateral and vertical loads which are normally encountered can now be accommodated without failure of the bearing seal 146 because with the present invention the lubricated bearing seal 146 converts these loads to a lubricated rolling motion as opposed to a dry rubbing motion.

It is the feature of the elastomer seal ring 156 being compressed by the seal carrier 152 against the bearing carrier 112 which allows for lateral and vertical motion of the inner and outer bearing races 158 and 160. This arrangement removes the damaging loads which would be applied to the light weight bearing seal 146. Also the inner and outer diameter and width of the bearing seal 146 determined by the inner and outer bearing races 158 and 160, the seal carrier 152, and the elastomer seal ring 156 are preselected to permit the bearing seal 146 to be interchangeable with a conventional lip seal. Thus the bearing seal 146 serves as a bearing seal cartridge which is easily inserted in a drill head assembly to replace a conventional lip seal without requiring modifications to be made to the structure of the bearing carrier 112 or the cover plate 116.

Figure 3:
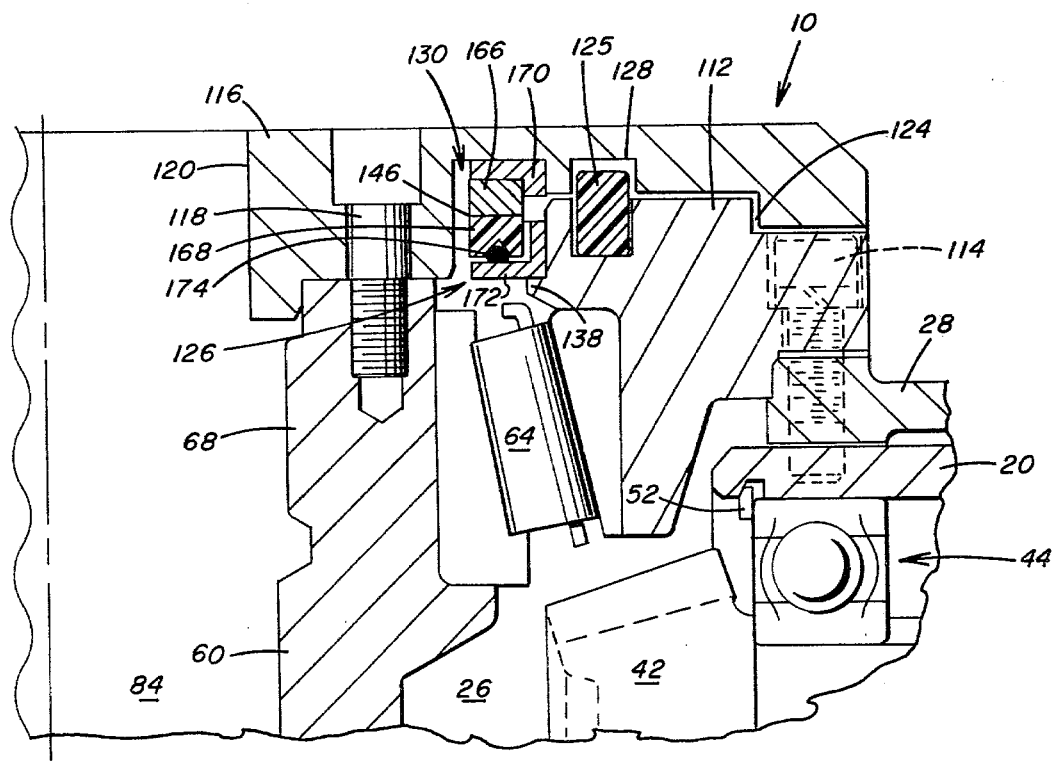
FIG. 3 is a view similar to FIG. 2, illustrating a further embodiment of the bearing seal that includes a face seal having static and dynamic portions supported in abutting and sealing relation between the cover plate and the bearing carrier.

Now referring to FIG. 3, there is illustrated a further embodiment of the load stress relieving device 130 of the present invention that includes a first face seal 166 and a second face seal 168. The first and second face seals 166 and 168 are positioned in surrounding coaxial relation with the cover plate 116 between the cover plate 116 and the bearing carrier 112. The first face seal 166 is positioned in overlying abutting relation with the second face seal 168. The first face seal 166 is a dynamic seal and the second face seal 168 is a stationary seal.

In the embodiment shown in FIG. 3 the annular seal device 126 includes a first portion 170 and a second portion 172. The first portion 170 is sealingly engaged between the first face seal 166 and the cover plate 116 for rotation with both the first face seal 166 and the cover plate 116. The second portion 172 is nonrotatably sealingly engaged to the bearing carrier 112 to support the second face seal 168 on the inner annular shoulder 138 of the bearing carrier 112.

An elastomer seal ring, such as the O-ring 174, is sealingly engaged between the second face seal 168 and the annular seal device second portion 172. This arrangement provides a seal around the first main bearing 64 and prevents the escape of lubricant from the upper portion of the drill housing chamber 26. The first face seal 166 is fabricated preferably of steel, and the second face seal 168 is preferably fabricated of a polymeric material, such as an ultra high molecular weight polymer. The first face seal 166 transfers heat from the second face seal outwardly to the cover plate 116. This arrangement also provides for vertical and lateral motion of the bearing seal 146 positioned between the rotatable cover plate 116 and the stationary bearing carrier 112.

As above described by permitting lateral and vertical motion of the seal surrounding the first main bearing 64, the lateral and vertical thrust loads transmitted to the seal are converted to a sliding motion externally of the cover plate 116. This arrangement relieves the seal 146 of the thrust loads which normally result in wear and eventual failure of the main bearing seal and accordingly the first main bearing 64. The thrust loads relieved by the bearing seal 146 are now transferred to the bearing carrier 112 and the first main bearing 64. The life of the bearing seal 146 is thus substantially extended to provide for more efficient operation of the drill head assembly 10.

Figure 4:
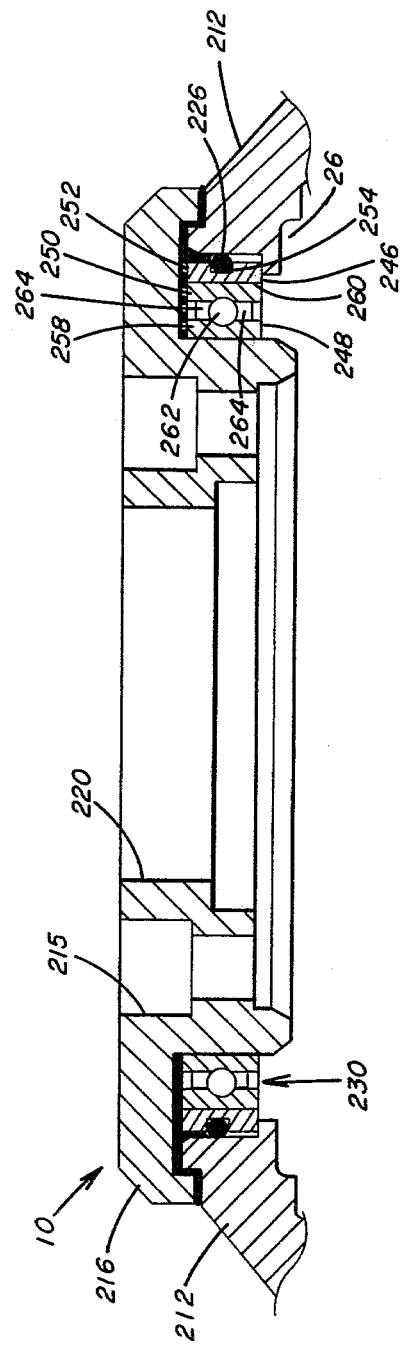
FIG. 4 is a view similar to FIG. 2, illustrating a semi-solid lubricant above the bearing seal for blocking the cover plate labyrinth clearance path against the entrance of foreign matter.

Further in accordance with the present invention there is illustrated an additional embodiment in FIG. 4 of the load stress relieving device similar to the embodiments shown in FIG. 2. In FIG. 4 the structural elements are indicated by the numerals of FIG. 2 raised by the factor 200 corresponding to like elements of FIG. 2.

A cover plate 216 in FIG. 4 has an outer diameter reduced in size compared to the cover plate 116 in FIG. 2. The cover plate 216 is positioned in overlying relation with a bearing carrier 212 and the upper end of the drill housing, which is not shown in FIG. 2. It should be understood that the drill housing structure described above and illustrated in FIG. 1 is also applicable for the embodiment shown in FIG. 4. The cover plate 216 is provided with apertures 215 for receiving bolts (not shown) that connect with the hub member (not shown). Also the bearing carrier 212 in FIG. 4 has an upper outer diameter reduced in size compared to the bearing carrier 112 shown in FIG. 2.

A load stress relieving device 230 includes a bearing seal 246 positioned between the cover plate 216 and the bearing carrier 212 for sealing the first main bearing (not shown) in a drill housing chamber 226. Preferably, the bearing seal 246 has a rotatable portion 248 positioned on the cover plate 216 and a stationary portion 250 abutting the bearing carrier 212. An annular seal device 226 is positioned by the bearing seal 246 in sealing relation with the bearing carrier 212. The annular seal device 226 is compressible to absorb lateral and vertical thrust forces and transfer the forces through the hub member to the first main bearing so that only rotational forces are carried by the cover plate 216 and the drill retaining member (not shown in FIG. 4) which is positioned in a central opening 220 of the cover plate 216.

The annular seal device 226 in FIG. 4 preferably includes a seal carrier or an outer race adapter ring 252 provided with an O-ring groove 254. Preferably the seal device 226 includes an elastomer seal ring positioned in the seal carrier O-ring groove 254. With this arrangement the elastomer seal ring 226 is compressed between the seal carrier 252 and the bearing carrier 212 to permit lateral and vertical motion of the entire bearing seal 246.

The bearing seal rotatable portion 248 has an inner bearing race 258 abutting the cover plate 216. The bearing seal stationary portion 250 includes an outer bearing race 260 adapted to maintain the annular seal member or elastomer seal ring 226 in sealing relation with the bearing carrier 212. Positioned between the inner bearing race 258 and the outer bearing race 260 are a plurality of ball bearings 262, one of which is illustrated in FIG. 4. The ball bearings 262 abut and are supported by the inner bearing race 258 and thereby rotate with the cover plate 216. On the opposite sides of the ball bearings 262 the ball bearings abut the outer bearing race 260. The ball bearings 262 are sealed within the inner end outer bearing races 258 and 260 by ring-like cages 264. The cages 264 maintain lubricant sealed within the inner and outer bearing races 258 and 260 in contact with the ball bearings 262.

The bearing seal 264 as above discussed for the embodiment shown in FIG. 2 is a lubricated bearing adapted to resist the deleterious environment of an underground mine that is known to hasten the failure of the main bearings of the drill head assembly by the entrance of dust and other contaminants into the drill head assembly and into contact with the main bearings. It is the feature of the ring-like cages 264 that maintains lubricant around the ball bearings 262 so that the dust contaminants do not come into contact with the main bearings.

According to the provisions of the Patent Statutes, I have explained the principle, preferred construction, and mode of operation of my invention and have now described what I now consider to represent its best embodiments. However, it should be understood that, within the scope of the appended claims, the invention may be practiced otherwise than as specifically illustrated and described.

I claim:

1. A drill head assembly comprising,
    a drill housing having a chamber,
    said chamber including an upper open end portion and a lower end portion,
    a rotatable drill retaining member positioned in said drill housing chamber and extending through said chamber upper open end portion,
    a hub member positioned in surrounding coaxial relation with said rotatable drill retaining member,
    said hub member and said rotatable drill retaining member being drivingly connected,
    a drive means secured to said hub member for transmitting rotation through said hub member and said rotatable drill retaining member,
    sealing means positioned in said chamber adjacent said lower open end portion thereof and abutting said hub member for sealing said chamber lower open end portion,
    bearing means for rotatably supporting said hub member in said chamber,
    said bearing means including a first main bearing positioned in said chamber adjacent said upper open end portion thereof,
    a bearing carrier secured to said drill housing, said bearing carrier supporting said first main bearing in said chamber,
    said drive means being positioned in said chamber below said first main bearing,
    a cover plate surrounding said rotatable drill retaining member to close said chamber upper open end portion, said cover plate being connected to said hub member to rotate with said hub member and said rotatable drill retaining member,
    an annular seal device sealingly engaging said bearing carrier above said first main bearing between said first main bearing and said cover plate,
    said annular seal device being operable to seal said chamber upper end portion from the entrance of foreign matter therein and to prevent the escape of lubricant from said chamber,
    load stress relieving means for preventing wear of said cover plate,
    said load stress relieving means being positioned between said cover plate and said annular seal device and including a first surface abutting said cover plate and a second surface abutting said annular seal device, and
    said load stress relieving means being rotatable with said cover plate to prevent wear forces from being applied to said annular seal device and failure of the seal maintained at said chamber upper open end portion.

2. A drill head assembly as set forth in claim 1 in which,
    said annular seal device includes a seal carrier and an elastomer seal ring, and
    said elastomer seal ring being compressed between said seal carrier and said bearing carrier to permit lateral and vertical motion of said annular seal device.

3. A drill head assembly set forth in claim 2 in which,
    said load stress relieving means includes a bearing having an outer race adapter ring being formed by said seal carrier,
    a ring-like groove in said outer race adapter ring, and
    said elastomer seal ring positioned in said ring-like groove and compressed in sealing engagement with said outer race adapter ring and said bearing carrier.

4. A drill head assembly as set forth in claim 3 in which,
    said bearing has an inner race abutting said cover plate,
    said inner race being rotatable relative to said outer race with lubricant provided therebetween,
    said outer race being stationarily supported by said bearing carrier,
    said inner and outer races being sealed to prevent the escape of lubricant from around said main bearing and between said inner and outer races, and
    said inner and outer races being operable to convert rubbing motion applied to said drill retaining member to lubricated rolling motion applied to said drill retaining member.

5. A drill head assembly as set forth in claim 1 in which,
    said load stress relieving means includes a lubricated ball bearing,
    said lubricated ball bearing having a rotatable inner race abutting said cover plate for rotation therewith and a nonrotatable outer race abutting said annular seal device,
    said annular seal device being retained in compression between said nonrotatable outer race and said bearing carrier to permit lateral and vertical motion of said lubricated ball bearing so as to relieve the load stresses applied to said lubricated ball bearing by said drill retaining member and transfer the load stresses around said load stress relieving means to said first main bearing.

6. A drill head assembly as set forth in claim 1 which includes,
    said bearing carrier having an inner annular shoulder, said annular seal device being supported by said inner annular shoulder, said cover plate being rotatable with said hub member, said annular seal device being stationarily positioned relative to said rotatable cover plate and said hub member, and said annular seal device being operable to absorb both lateral and vertical motion transmitted from said cover plate to said load stress relieving means.

7. A drill head assembly as set forth in claim 1 in which, said load stress relieving means includes a first face seal and a second face seal, said first and second face seals being positioned within said chamber upper open end portion in surrounding relation with a portion of said cover plate between said cover plate and said bearing carrier, said first face seal being positioned in overlying abutting relation with said second face seal, said first face seal being a dynamic seal and said second face seal being a stationary seal, said annular seal device including a first portion and a second portion, said annular seal device first portion sealingly engaged between said first face seal and said cover plate for rotation with both said first face seal and said cover plate, and said annular seal device second portion being nonrotatably sealingly engaged to said bearing carrier to support said second face seal on said bearing carrier.

8. A drill head assembly as set forth in claim 7 which includes, an O-ring seal sealingly engaged between said second face seal and said annular seal device second portion to seal around said first main bearing and prevent the escape of lubricant from said chamber upper open end portion.

9. A drill head assembly as set forth in claim 7 in which, said first face seal is fabricated of steel and said second face seal is fabricated of a polymeric material, and said first face seal being operable to transfer heat from said second face seal to said cover plate.

10. A drill head assembly as set forth in claim 1 in which, said load stress relieving means includes an annular wear sleeve sealingly engaged in surrounding relation with a portion of said cover plate, and said wear sleeve being positioned between said cover plate and said annular seal device and abutting said annular seal device to absorb lateral and vertical forces transmitted by said cover plate to prevent wear of said annular seal device.

11. A drill head assembly comprising, a drill housing having a chamber, said chamber including an upper open end portion and a lower end portion, a rotatable drill retaining member positioned in said housing chamber and extending through such chamber upper open end portion, a hub member positioned in surrounding coaxial relation with said rotatable drill retaining member, said hub member and said rotatable drill retaining member being drivingly connected, drive means secured to said hub member for transmitting rotation to said hub member and said rotatable said drill retaining member, sealing means positioned in said chamber adjacent to said lower end portion thereof and abutting said hub member for sealing said chamber lower end portion, bearing means for rotatably supporting said hub member in said chamber, said bearing means including a first main bearing positioned in said chamber adjacent to said upper open portion thereof, a bearing carrier secured to said drill housing, said bearing carrier supporting said first main bearing in said chamber, said drive means being positioned in said chamber below said first main bearing, a cover plate surrounding said rotatable drill retaining member to close said chamber upper open end portion, said cover plate being connected to said hub member to rotate with said hub member and said rotatable drill retaining member, a bearing seal positioned between said cover plate and said bearing carrier above said first main bearing to seal said first main bearing in said drill housing, said bearing seal having a rotatable portion abutting said cover plate and a stationary portion abutting said bearing carrier, an annular seal member carried by said stationary portion in sealing relation with said bearing carrier, and said annular seal member being compressible to absorb lateral and vertical forces and transfer said forces to said first main bearing so that only rotational forces are carried by said cover plate and said drill retaining member.

12. A drill head assemblyh as set forth in claim 11 in which, said rotatable portion includes an inner bearing race abutting said cover plate, said stationary portion includes an outer bearing race adapted to maintain said annular seal member in sealing relation with said bearing carrier, said outer bearing race being stationarily supported by said bearing carrier, said inner and outer bearing races being sealed to prevent the escape of lubricant from around said main bearing and between said inner and outer bearing races; and said inner and outer bearing races being operable to convert rubbing action applied to said cover plate to lubricated rolling motion applied to said bearing seal.

13. A drill head assembly as set forth in claim 11 in which, said bearing seal includes a ball bearing, said rotatable portion forming an inner race of said ball bearing, said stationary portion forming an outer race of said ball bearing, a seal carrier engaging in surrounding relation said outer race, said seal carrier having an outer annular groove, and said annular seal member being positioned in said outer annular groove and compressed in sealing engagement with said bearing carrier.

14. A drill head assembly as set forth in claim 11 in which,
  said bearing seal rotatable portion includes an outer race adapter ring,
  a ring-like groove in said outer race adapter ring, and
  said annular seal member being positioned in said ring-like groove and compressed in sealing engagement with said outer race adapter ring and said bearing carrier.

15. A drill head assembly as set forth in claim 11 which includes,
  said bearing carrier having an inner annular shoulder,
  said bearing seal stationary portion being supported by said inner annular shoulder,
  said annular seal member being sealingly compressed between said stationary portion and said bearing carrier,
  said rotatable portion being rotatable with said cover plate and said hub member relative to said stationary portion, and
  means for retaining lubricant between said rotatable portion and said stationary portion.

* * * * *